Figure 1:
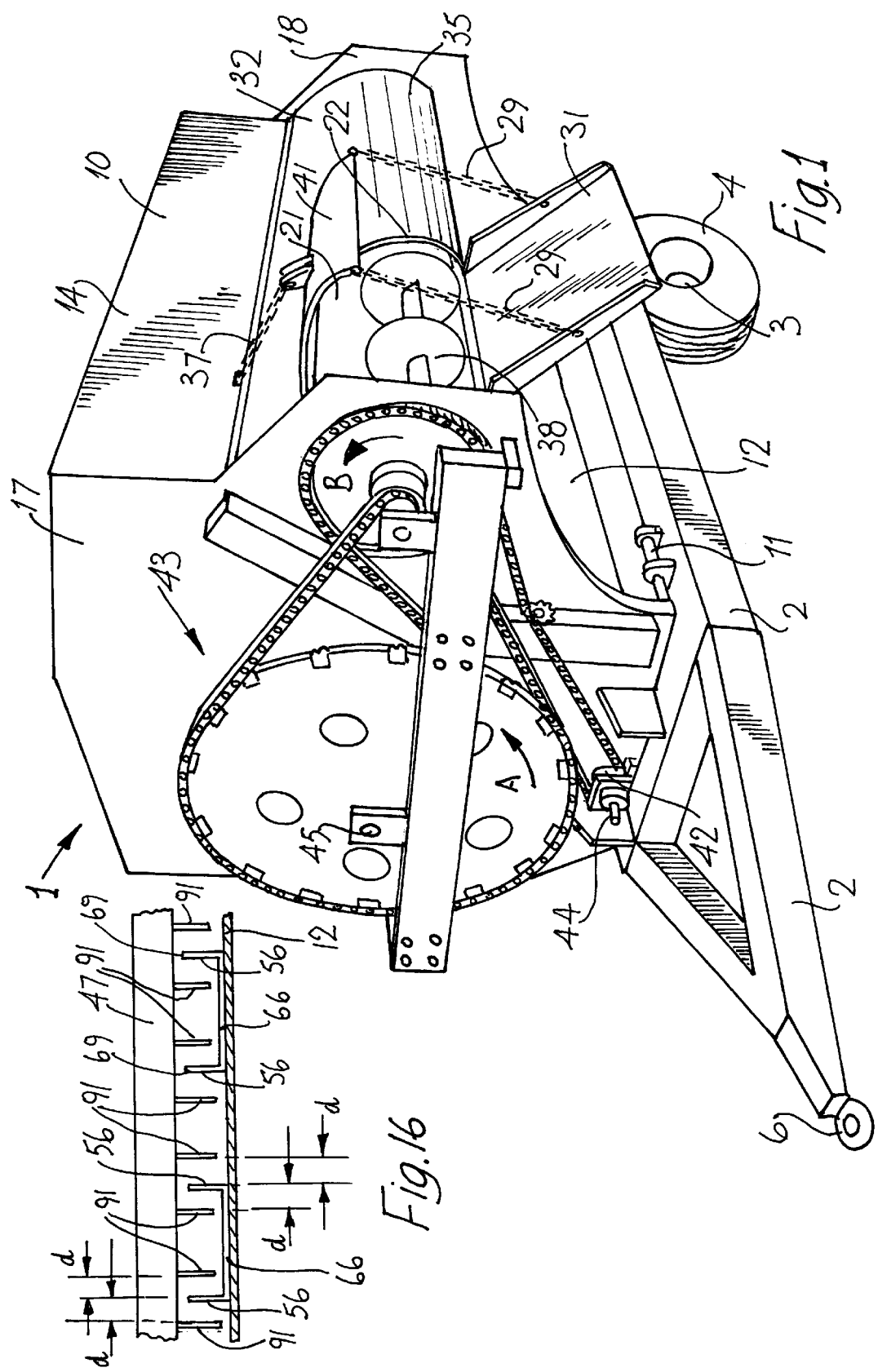

United States Patent [19]
O'Neill et al.

[11] Patent Number: 5,967,433
[45] Date of Patent: Oct. 19, 1999

[54] MIXING AND DISPENSING APPARATUS

[75] Inventors: Oliver O'Neill, Bagenalstown; Thomas Foley, Borris; Richard Keenan, Bagenalstown, all of Ireland

[73] Assignee: Salford Engineering Limited, Borris, Ireland

[21] Appl. No.: 08/945,018

[22] PCT Filed: Apr. 19, 1996

[86] PCT No.: PCT/IE96/00024

§ 371 Date: Oct. 20, 1997

§ 102(e) Date: Oct. 20, 1997

[87] PCT Pub. No.: WO96/32836

PCT Pub. Date: Oct. 24, 1996

[30] Foreign Application Priority Data

| Apr. 20, 1995 | [IE] | Ireland | S950281 |
| Aug. 4, 1995 | [IE] | Ireland | S950593 |
| Oct. 23, 1995 | [IE] | Ireland | S950826 |

[51] Int. Cl.⁶ ............................ B02C 19/12; B02C 21/02
[52] U.S. Cl. ................. 241/101.2; 241/101.76; 241/186.5; 241/243; 241/605
[58] Field of Search ..................... 241/605, 243, 241/101.1, 101.01, 186.5, 292.1, 101.76, 101.2

[56] References Cited

U.S. PATENT DOCUMENTS

| 2,148,547 | 2/1939 | Fiese et al. | 130/27 |
| 2,842,175 | 7/1958 | Thompson | 146/123 |
| 2,865,416 | 12/1958 | Hetteen | 146/117 |
| 2,889,862 | 6/1959 | Willaimson | 146/119 |
| 2,970,780 | 2/1961 | Bowen | 241/101 |
| 3,258,210 | 6/1966 | Panning | 241/85 |
| 3,350,017 | 10/1967 | Howell et al. | 239/660 |
| 3,392,769 | 7/1968 | Gronberg | 146/123 |
| 3,834,630 | 9/1974 | Nelson | 241/19 |
| 4,004,738 | 1/1977 | Hawkins | 241/29 |
| 4,177,866 | 12/1979 | Mitchell | 175/53 |
| 4,643,364 | 2/1987 | Lucas | 241/55 |
| 4,760,967 | 8/1988 | Bendickson | 241/101.7 |
| 4,801,101 | 1/1989 | Dreyer et al. | 241/240 |
| 4,846,411 | 7/1989 | Herron et al. | 241/101.7 |
| 4,896,970 | 1/1990 | Schuler | 366/296 |
| 4,951,883 | 8/1990 | Loppoli et al. | 241/101 B |
| 5,368,238 | 11/1994 | Bergkamp et al. | 241/30 |
| 5,622,323 | 4/1997 | Krueger et al. | 241/101.76 |

FOREIGN PATENT DOCUMENTS

| 541409 | 9/1955 | Belgium. |
| 0427483A1 | 11/1990 | European Pat. Off.. |
| 0562693A1 | 3/1993 | European Pat. Off.. |
| 06060087A1 | 1/1994 | European Pat. Off.. |
| 2139911 | 4/1984 | United Kingdom. |

*Primary Examiner*—John M. Husar
*Attorney, Agent, or Firm*—Nixon & Vanderhye. P.C.

[57] ABSTRACT

A mixer feeder wagon (1) for mixing animal feed which includes hay, straw, silage and the like, including a mixing compartment (20) and a dispensing compartment (21). A mixing rotor (30) is rotatable in the mixing compartment (20) for mixing the animal feed, and a dispensing auger (38) in the dispensing compartment (21) dispenses the mixed animal feed through a dispensing outlet (22). A plurality of first blades (55) extend radially from mixing paddles (47) of the mixing rotor (30) and co-operate with a plurality of second blades (56) which are mounted on a base (12) of the mixing compartment (20) for cutting the fibrous material of the animal feed into relatively short lengths as the mixing rotor (30) rotates.

31 Claims, 6 Drawing Sheets

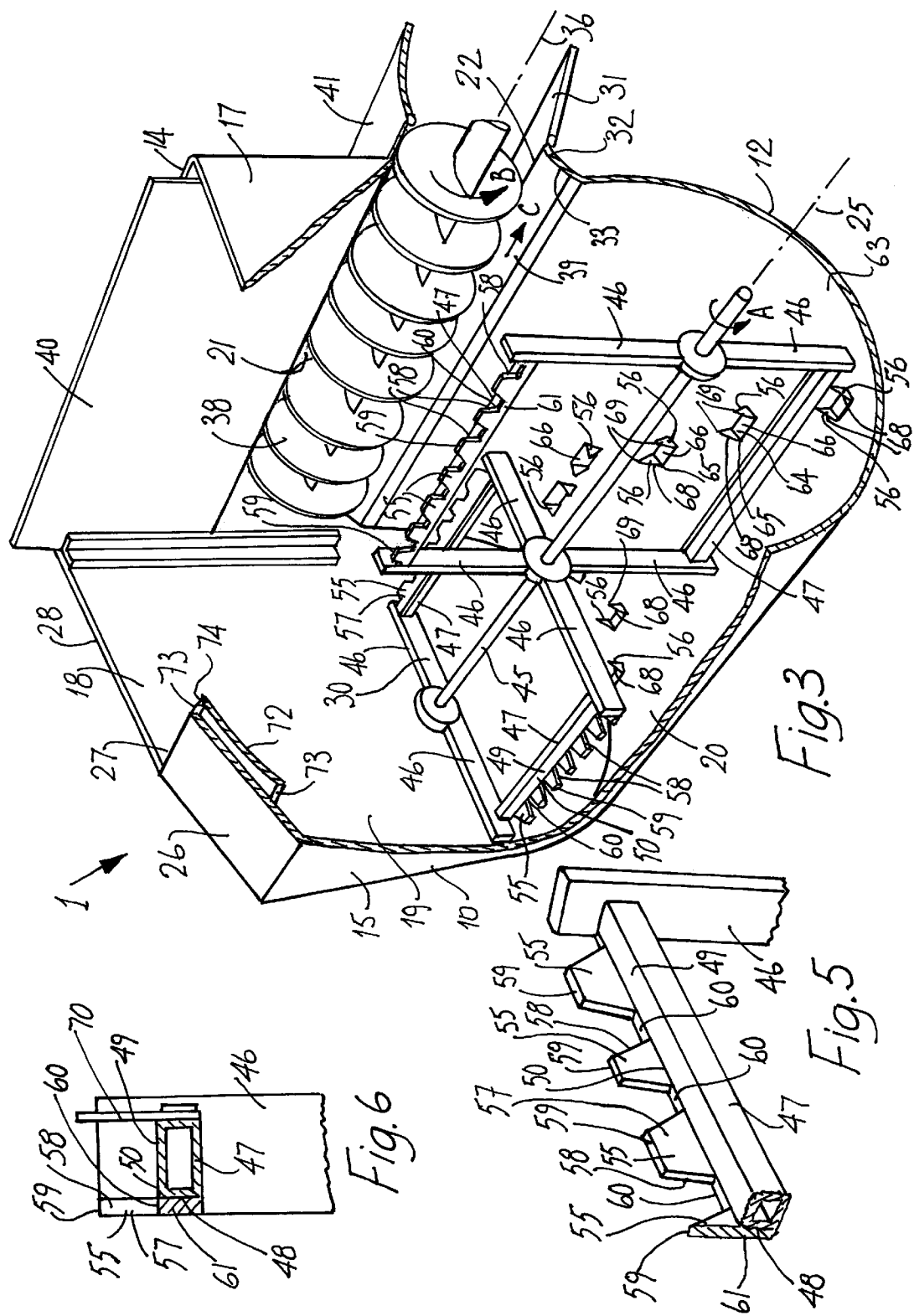

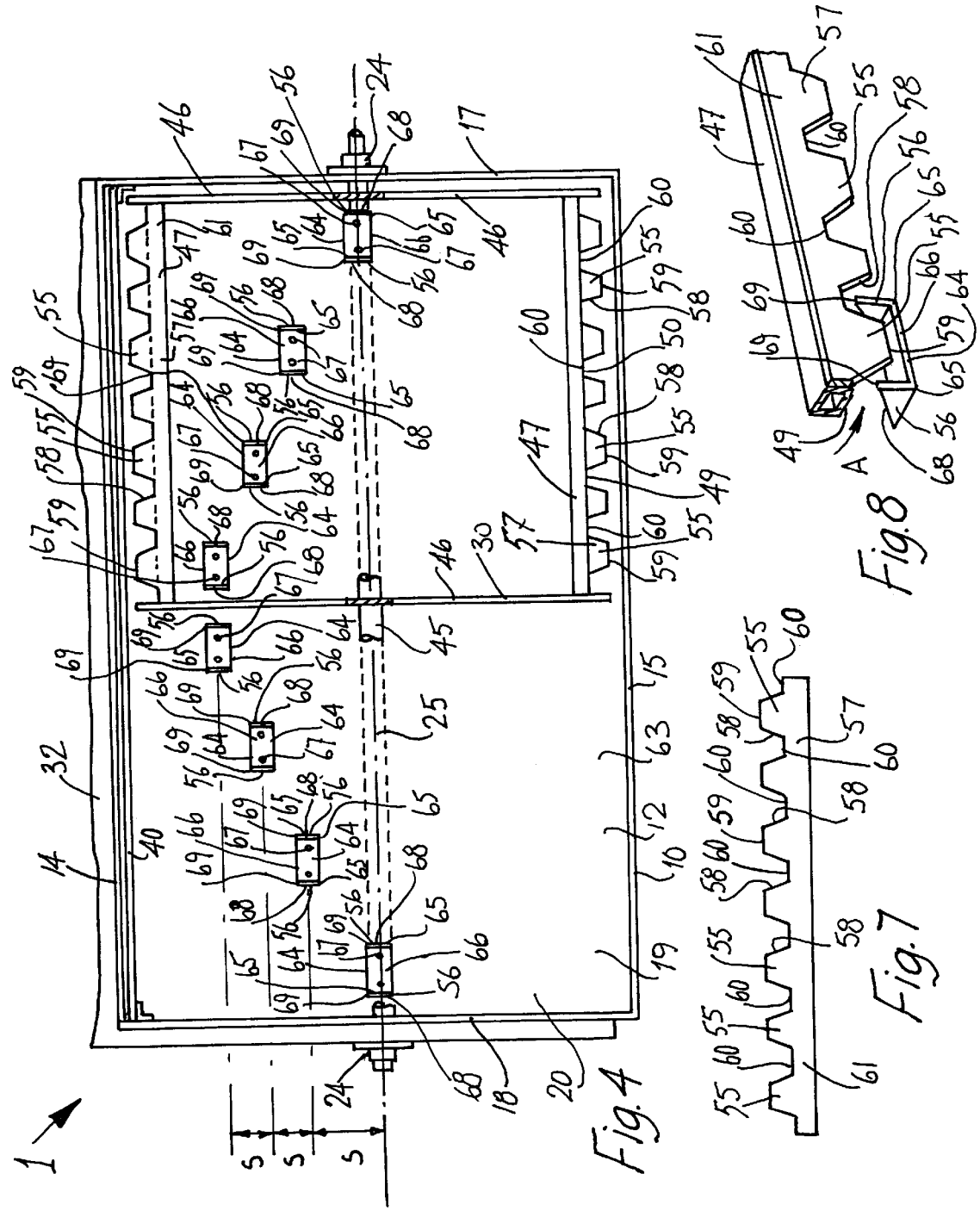

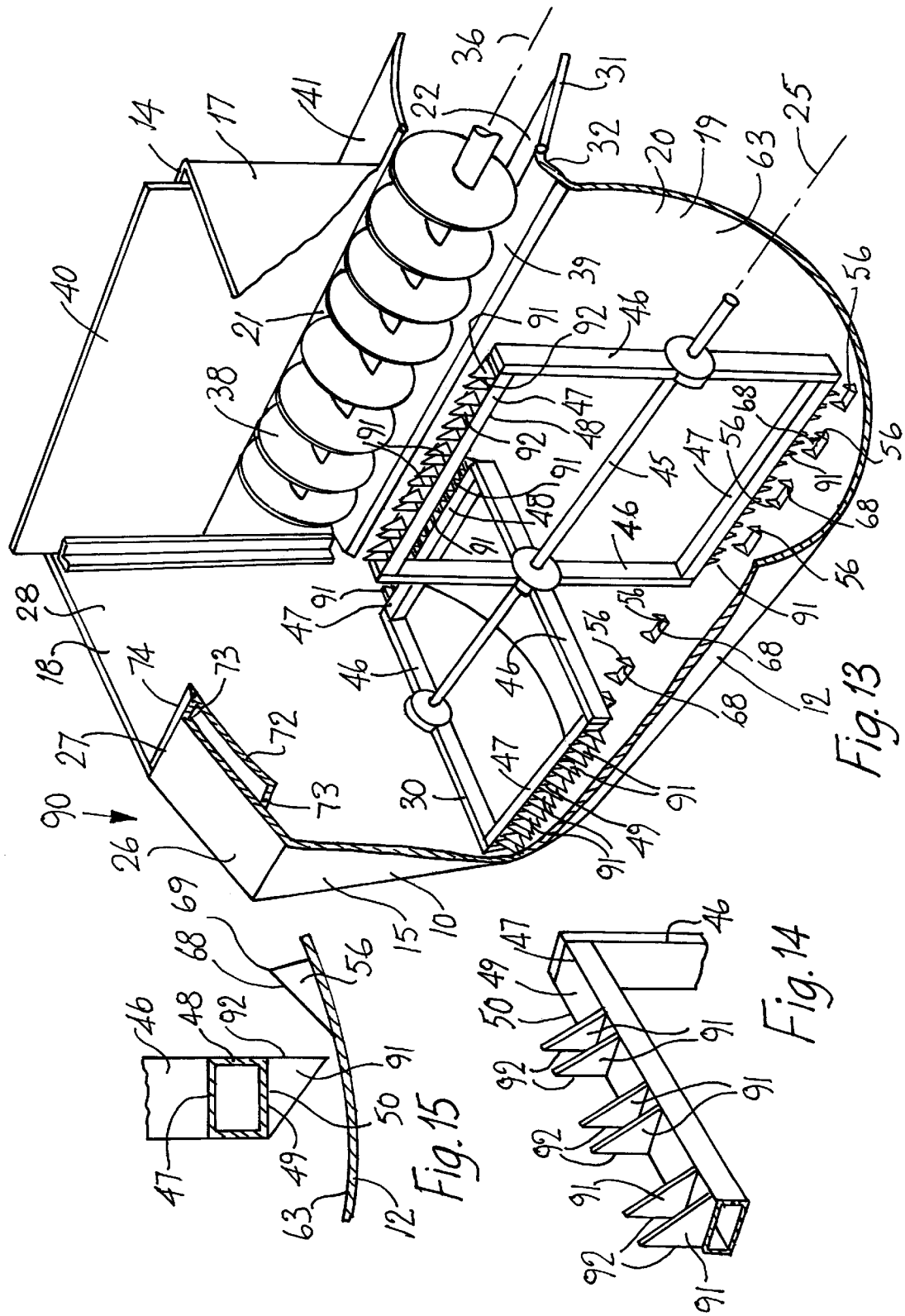

MIXING AND DISPENSING APPARATUS

The present invention relates to apparatus for mixing and dispensing material, and in particular, fibrous type material, for example, animal feed which contains relatively long fibrous matter, such as, for example, hay, straw, silage and the like, and in particular, though not limited to such fibrous matter when delivered to the apparatus in the form of a relatively large bale or part thereof, typically, a relatively large cylindrical bale, commonly referred to as a round bale or a relatively large square or rectangular bale.

It is common nowadays to bale silage, hay and straw in relatively large bales, typically, bales of up to 2 M in diameter and greater. Such fibrous material, is used extensively for mixing with other ingredients in the preparation of animal feed. Apparatus for mixing and dispensing animal feed of this type is disclosed in British Patent Specification No. GB-A-2,139,911 and European Patent Specification No. EP-A-0,427,483. However, such mixing and dispensing apparatus while it is quite adequate for mixing and dispensing animal feed containing fibrous type material, where the fibrous material is hay, straw or relatively long cut silage, in general, the fibrous material remains in relatively long lengths when mixed with other ingredients to form the animal feed. This, in many cases is undesirable.

There is therefore a need for a mixing and dispensing apparatus which overcomes this problem.

The present invention is directed towards providing such apparatus for mixing and dispensing material of a generally fibrous nature, and for cutting the fibrous material into relatively short lengths.

According to the invention there is provided apparatus for mixing and dispensing material of a fibrous nature, the apparatus comprising a container defining a hollow interior region which forms a mixing compartment for the material, the mixing compartment defining a longitudinally extending central axis, a mixing rotor in the mixing compartment for mixing material therein, the mixing rotor being rotatable in the mixing compartment about a rotational axis substantially coinciding with the central axis, wherein the mixing rotor comprises a plurality of first blades spaced apart longitudinally along the mixing rotor relative to the central axis and extending in a generally radial direction from the mixing rotor, and a plurality of second blades are connected to the container, the second blades being spaced apart longitudinally relative to the central axis and extending towards the mixing rotor and co-operating with the first blades for cutting the fibrous material as the mixing rotor rotates.

The advantages of the invention are many. The first blades on the mixing rotor co-operate with the second blades as the mixing rotor rotates, and on fibrous material being engaged between co-operating first and second blades, the fibrous material is cut into relatively short lengths. The lengths into which the fibrous material is cut is dependent on the spacing between the pairs of second blades, and also, is dependent on the clearance between the first and second blades. It has been found that by providing a clearance of between 20 mm and 50 mm between the first and second blades, and also providing the spacing between pairs of second blades of the order of 210 mm, the fibrous material is cut into lengths of approximately 100 mm after the mixing rotor has completed many rotational cycles. Needless to say, the more rotational cycles completed by the mixing rotor, in general, the shorter will be the length to which the fibrous material is cut, subject to a minimum length of approximately 30 mm which in general will be just greater than the clearance between the first and second blades. Once the fibrous material has been cut to length which is just greater than the clearance between adjacent first and second blades, the first and second blades will have little further cutting effect on the fibrous material, since the lengths of fibrous material at that stage would be insufficient to extend across a gap between adjacent first blades, and thus, the co-operating action between the first and second blades would have little further cutting effect. Indeed, the co-operating action of the first and second blades would have little cutting effect on cut lengths of fibre which are shorter than the gaps between adjacent first blades unless such short lengths are matted with longer lengths of fibrous material which are in turn urged by the first blades into cutting engagement with the second blades for cutting thereof.

In practice, the fibrous material is cut by the cutting action of the second blades on the lengths of fibrous material extending across the gap between adjacent first blades as the fibrous material is urged against the second blades by the first blades on rotation of the mixing rotor. Typically, the first blades are arranged so that one second blade passes between adjacent first blades as the mixing rotor rotates, and thus, fibrous material extending between adjacent first blades is urged against a second blade which cuts the fibrous material.

In practice, the more rotational cycles of the mixing rotor to which the fibrous material is subjected, the shorter will be the lengths into which the fibrous material is cut, subject to a minimum length, which is equal to approximately half the spacing between adjacent first blades as discussed above.

In one aspect of the invention the first and second blades are located so that the second blades extend in between the first blades as the first blades pass by the second blades on rotation of the mixing rotor.

Preferably, the second blades are arranged in pairs so that one first blade passes between a corresponding adjacent pair of second blades, on rotation of the mixing rotor.

In one aspect of the invention each first blade is formed by a first plate member.

In another aspect of the invention a plurality of first blades are formed by a single elongated plate member, a plurality of spaced apart slots extending radially into the elongated plate member from a free longitudinally extending edge of the elongated plate member for forming the respective first plate members.

In general, the second blades extend in respective planes which extend in a generally radial direction towards the central axis and transversely thereof. Preferably, the second blades are parallel to each other.

In one aspect of the invention the first blades extend perpendicularly to the second blades, as the first blades pass adjacent the second blades.

In another aspect of the invention each second blade is formed by a second plate member. Preferably, the second plate members are parallel to each other and extend transversely relative to the central axis.

Preferably, each first blade lies in a plane which extends parallel to the central axis of the mixing compartment.

Alternatively, the first blades lie in respective planes which extend parallel to each other and transversely of the central axis.

It is preferable that each second blade defines a leading cutting edge which faces towards the first blades as the first blades are approaching the second blade. Ideally, the leading cutting edge of each second blade is inclined relative to a radius extending from the central axis so that the first blades progressively co-operate with the leading cutting edges of the second blades as the mixing rotor rotates.

Preferably, the leading cutting edge of each second blade is angled away from the central axis in the direction of motion of the first blades as they approach the second blades.

In one aspect of the invention each second blade is tapered adjacent and towards the leading cutting edge for forming a relatively sharp leading cutting edge.

It has been found that by inclining the leading cutting edge of the second blades so that the first blades progressively engage the leading cutting edges of the second blades, the power requirement of the mixing rotor is significantly reduced, without loss of cutting action.

Alternatively, the leading cutting edge of each second blade is relatively blunt.

Ideally, clearance is provided between adjacent first and second blades in a direction parallel to the central axis as the first blades pass by the second blades on rotation of the mixing rotor. In one aspect of the invention the clearance provided between adjacent first and second blades is in the range of 2 mm to 300 mm. Preferably, the clearance between adjacent first and second blades is in range of 10 mm to 100 mm. Advantageously, the clearance between adjacent first and second blades is in the range of 20 mm to 50 mm.

In one aspect of the invention the second blades are mounted on the container forming the mixing compartment, and extend inwardly into the mixing compartment.

Preferably, the second blades are mounted on the container adjacent a lower end of the mixing compartment.

Advantageously the second blades are located in the mixing compartment so that the first blades commence to co-operate with the second blades as the first blades reach their lowest point in a rotational cycle of the mixing rotor for enhancing the cutting action of the co-operating first and second blades.

In one aspect of the invention at least some of the second blades are located in the mixing compartment in staggered relationship relative to the other second blades in a circumferential direction relative to the direction of rotation of the mixing rotor so that the first blades progressively co-operate with the second blades as the mixing rotor rotates for minimising the power requirement for cutting the fibrous material.

An advantage of staggering the second blades in a circumferential direction relative to the rotational movement of the mixing rotor is that the first blades progressively co-operate with the second blades on rotation of the mixing rotor for cutting the fibrous material, and thus, the power requirement for driving the mixing rotor is less than if all the first cutting blades co-operated with all the second cutting blades simultaneously.

Alternatively, or in addition to staggering the second blades, some of the first blades may be arranged in staggered relationship relative to each other in a circumferential direction relative to the central axis.

In one aspect of the invention the second blades are mounted on an inner surface of the of the container defining the mixing compartment.

In another aspect of the invention the second blades are stationary blades.

Alternatively, the second blades are moveable between an operative position whereby the second blades co-operate with the first blades, and an inoperative position for preventing co-operation between the first and second blades.

An advantage of having the second blades moveable between an operative and an inoperative position is that once the fibrous material has been cut into a desired length, the second blades may be moved into the inoperative position for the remainder of the mixing of the material in the mixing compartment, thereby, further minimising the power requirement of the mixing rotor. In such cases, it is envisaged that the relatively long fibrous material may be delivered to the mixing compartment initially for cutting into relatively short lengths, and on being cut into the short lengths, the second blades would be moved into the inoperative position, and the rest of the ingredients to be mixed with the fibrous material would then be added to the mixing compartment for mixing with the fibrous material with the second blades in the inoperative position. In this way, the power requirement of the mixing rotor would be minimised, since during mixing of the ingredients with the fibrous material no cutting action would occur.

In one aspect of the invention the second blades are mounted on a carrier means, the carrier means being moveable between an operative position and an inoperative position corresponding respectively to the operative and inoperative positions of the second blades. Preferably, the carrier means is pivotally mounted on the container and is pivotal about a pivot axis between the operative and inoperative positions. Advantageously, the pivot axis of the carrier means extends substantially parallel to the central axis. Preferably, the carrier means is mounted externally on the container.

In another aspect of the invention the second blades extend through blade accommodating slots formed in the container, and are moveable between the operative and inoperative positions through the slots.

Ideally, the second blades are withdrawn from the mixing compartment in the inoperative position.

In another aspect of the invention a drive means for moving the second blades between the operative and inoperative positions is provided. Preferably, the drive means comprises a ram which is connected between the container and the carrier means.

In one aspect of the invention the mixing rotor comprises a plurality of elongated mixing paddles circumferentially spaced apart around the rotational axis of the mixing rotor, the mixing paddles being carried on respective elongated radial members extending radially from the mixing rotor, the first blades being mounted on and extending radially outwardly from at least one of the mixing paddles.

In another aspect of the invention the mixing paddle is provided with a leading surface for abutting the material as the mixing rotor rotates, the leading surface extending substantially radially and substantially parallel to the central axis, the first blades extending radially outwardly from the leading surface.

In a further aspect of the invention the mixing rotor comprises a main shaft which defines the rotational axis of the mixing rotor, the radial members extending radially from the main shaft to the respective mixing paddles.

Preferably, the mixing paddles are equi-spaced circumferentially around the mixing rotor.

Advantageously, the container is of partly circular transverse cross section relative to the central axis, and defines a partly circular base of the mixing compartment.

In another aspect of the invention the locus of the free ends of the of the first blades as the mixing rotor rotates substantially defines the inner surface of the base of the mixing compartment.

Preferably, a clearance is provided between the free ends of the first blades and the base of the mixing compartment, the clearance being in the range of 2 mm to 100 mm.

Advantageously, the clearance between the free ends of the first blades and the base of the mixing compartment is approximately 20 mm.

In a further aspect of the invention the container defines an upwardly facing open mouth to the hollow interior region, and an elongated cutting member extends substantially parallel to the central axis adjacent the open mouth, the cutting member having a leading cutting edge extending parallel to the central axis and into the open mouth for co-operating with the mixing rotor for separating fibrous material from a relatively large bale of fibrous material supported in the open mouth.

Preferably, the container defines a dispensing compartment which defines a secondary axis, the dispensing compartment extending relative to the mixing compartment so that the secondary axis and the central axis extend substantially parallel to each other, a dispensing rotor being located in the dispensing compartment for dispensing mixed material through a dispensing outlet, the dispensing compartment communicating with the mixing compartment through a communicating opening, and a closure plate being operable between a closed position with the dispensing compartment isolated from the mixing compartment and an open position with the dispensing compartment and the mixing compartment communicating for transfer of mixed material from the mixing compartment into the dispensing compartment.

Figure 2:
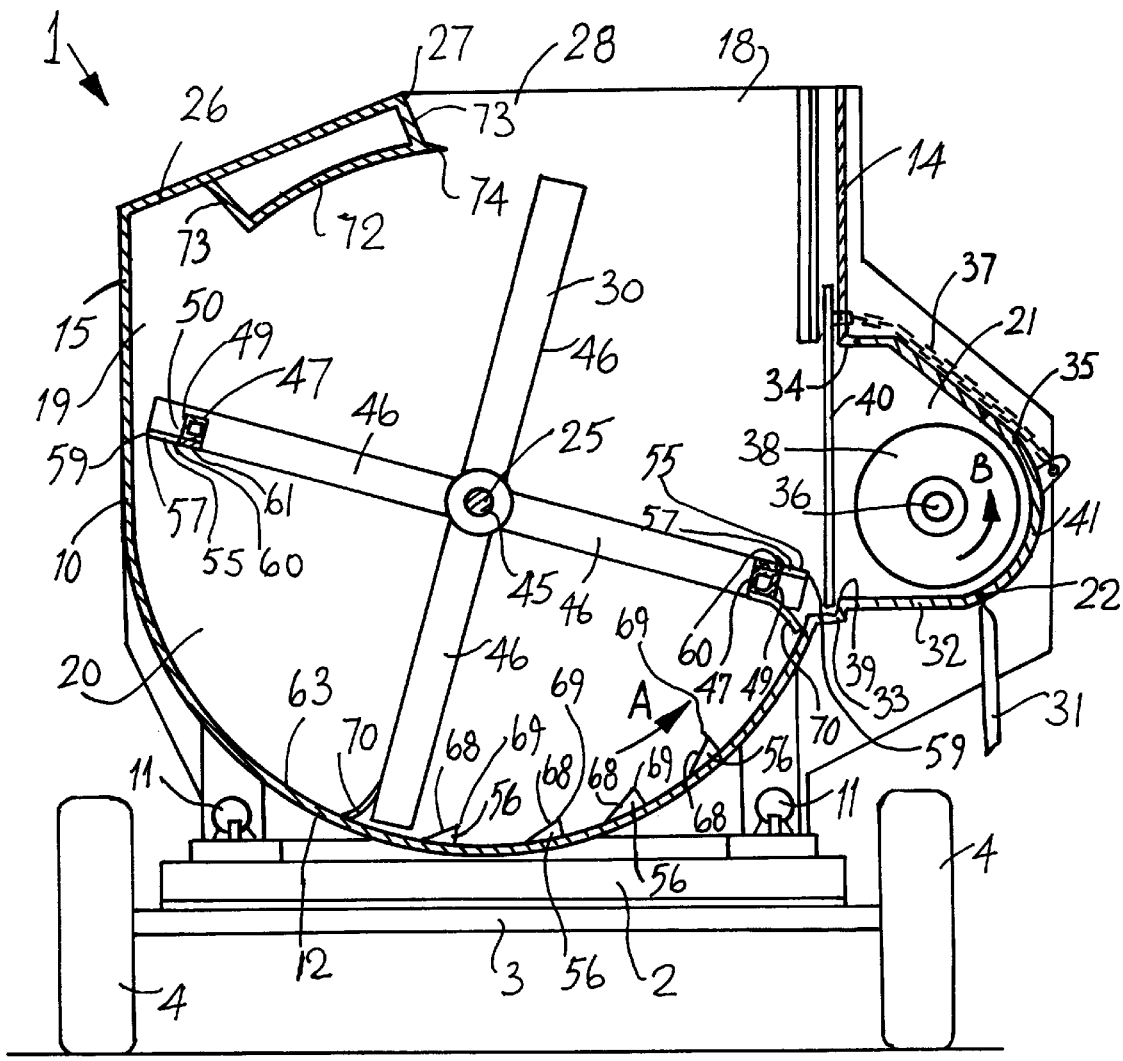
Figure 9:
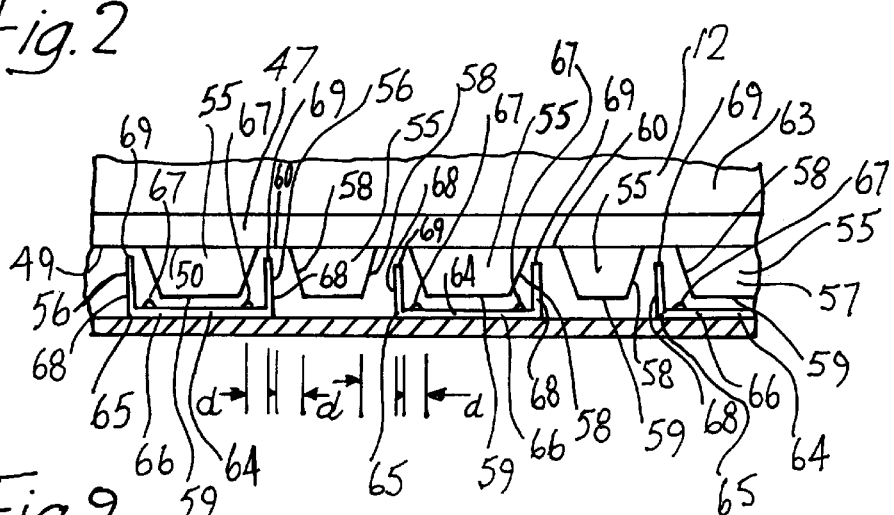
Figure 10:
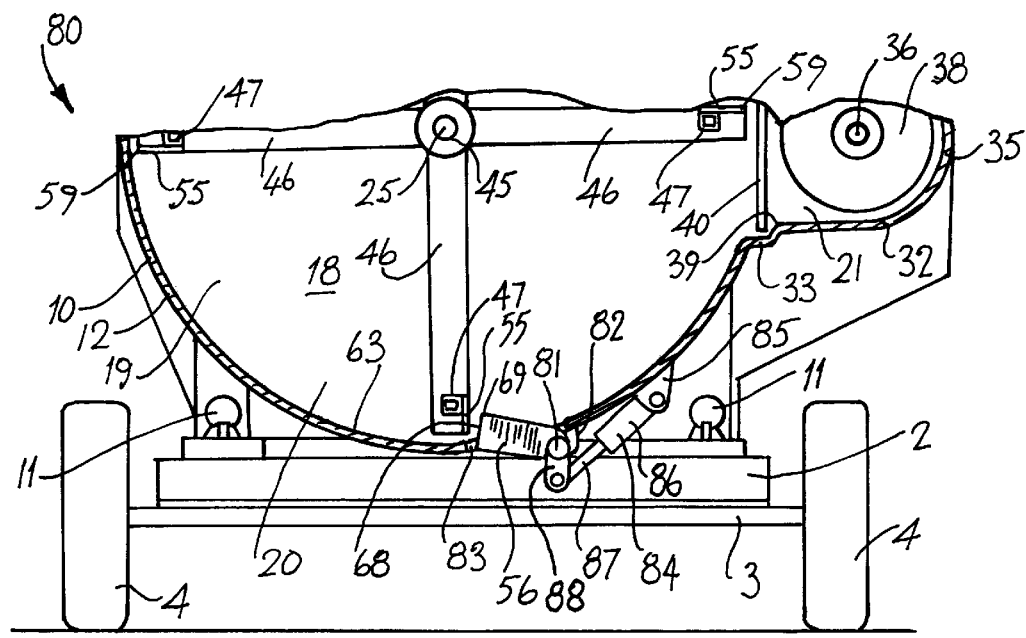
Figure 11:
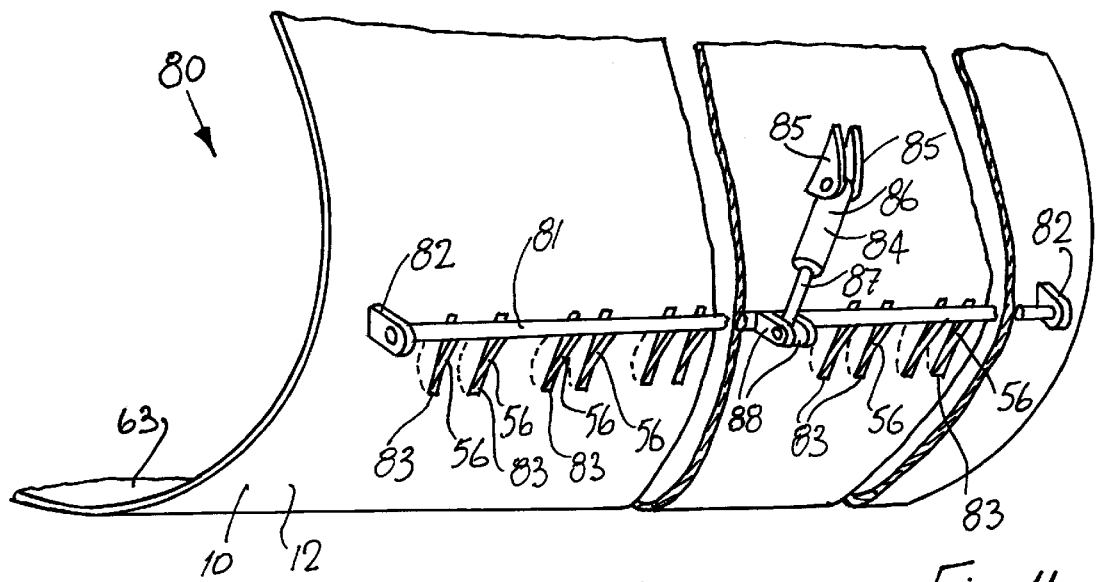
Figure 12:
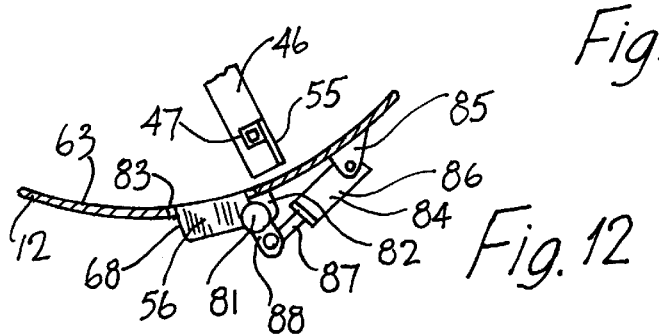

The invention will be more clearly understood from the following description of some preferred embodiments thereof which are given by way of example only, with reference to the accompanying drawings, in which:

FIG. 1 is a perspective view of apparatus according to the invention for mixing and dispensing material, FIG. 2 is a cross-sectional end elevational view of the apparatus of FIG. 1, FIG. 3 is a partly cut away perspective view of part of the apparatus of FIG. 1, FIG. 4 is a plan view of a portion of the apparatus of FIG. 1 with parts of the apparatus removed for clarity, FIG. 5 is a perspective view of a detail of the apparatus of FIG. 1, FIG. 6 is a cross-sectional end elevational view of the detail of FIG. 5, FIG. 7 is an elevational view of a portion of the detail of FIG. 5, FIG. 8 is a perspective view also of the detail of FIG. 5, FIG. 9 is an elevational view of the detail of FIG. 5, illustrating the co-operating action between the detail of FIG. 5 and another detail of the apparatus of FIG. 1, although the view is not altogether accurate, but is illustrated in this fashion for the purpose of illustrating the relationship between the two components, FIG. 10 is a cross-sectional end elevational view of a portion of apparatus according to another embodiment of the invention for mixing and dispensing material, FIG. 11 is an underneath perspective view of a portion of the apparatus of FIG. 10, FIG. 12 is a cross-sectional end elevational view of a detail of the apparatus of FIG. 10, FIG. 13 is a partly cut away perspective view, which is similar to FIG. 3 of apparatus according to a further embodiment of the invention for mixing and dispensing material, FIG. 14 is a perspective view of a detail of the apparatus of FIG. 13, FIG. 15 is a cross-sectional end elevational view of the detail of FIG. 14 co-operating with another detail of the apparatus of FIG. 13, and FIG. 16 is a side elevational view of the detail of FIG. 15.

Referring to the drawings and initially to FIGS. 1 to 9 there is illustrated apparatus according to the invention for mixing and dispensing fibrous material, which in this case, is a mixer feeder wagon indicated generally by the reference numeral 1. The mixer feeder wagon 1 is particularly suitable for mixing and dispensing fibrous animal feed, and is also suitable for cutting fibrous material, such as, for example, hay, straw, silage and the like into relatively short lengths, typically, of 10 mm to 200 mm length prior to and during mixing with other ingredients. Typically, the hay, straw or silage is delivered to the mixer feeder wagon 1 in the form of a relatively large round, square or rectangular bale, typically, a round bale of diameter of approximately 2 M. The mixer feeder wagon 1 comprises a chassis 2 to which an axle 3 is mounted which in turn rotatably carries a pair of ground engaging wheels 4. A tow-hitch 6 is mounted on the chassis 2 for facilitating hitching of the wagon 1 to a tractor (not shown) or other suitable towing vehicle. A container 10 for the material is mounted on the chassis 2 through four load cells 11 for facilitating weighing of material in the container 10. The mounting of such containers 10 on load cells 11 will be well known to those skilled in the art and is described with reference to the mixer feeder wagons which are disclosed in British Patent Specification No. GB-A-2, 139,911.

The container 10 comprises a base 12 of substantially semi-circular transverse cross-section and a pair of side walls 14 and 15 which extend upwardly from the base 12. A front end wall 17 and a rear end wall 18 extend from the base 12 between the side walls 14 and 15, and together with the base 12 and side walls 14 and 15 define a hollow interior region 19. The hollow interior region 19 forms a mixing compartment 20 within which the animal feed is mixed and a dispensing compartment 21 through which mixed animal feed is dispensed through a dispensing outlet 22, as will be described below.

The base 12 defines an axis of generation which extends longitudinally of the container 10 and defines a central axis 25 of the mixing compartment 20. An inclined wall 26 extends upwardly inwardly from the side wall 15 and terminates in a longitudinally extending edge 27 which defines with the side wall 14 and end walls 17 and 18 an upwardly facing open mouth 28 which provides access to the mixing compartment 20 through which fibrous material and the other ingredients of the animal feed are loaded into the mixing compartment 20. A mixing rotor 30 is rotatably mounted in the mixing compartment 20 as will be described below and is rotatable in the direction of the arrow A for mixing ingredients of the animal feed therein.

The dispensing compartment 21 is formed by a partly arcuate side wall 32 which extends sidewardly from the container 10 between a top edge 33 of the base 12 and a lower edge 34 of the side wall 14. A partly arcuate portion 35 of the side wall 32 defines a secondary axis 36 which forms a central axis of the dispensing compartment 21. The secondary axis 36 of the dispensing compartment 21 is parallel to the central axis 25 of the mixing compartment 20. A dispensing auger 38 is rotatably mounted in the dispensing compartment 21, and is rotatable in the direction of the arrow B for urging animal feed along the dispensing compartment 21 in the direction of the arrow C towards the dispensing outlet 22. The dispensing auger 38 is rotatably mounted in bearings (not shown) in the end walls 17 and 18 so that the rotational axis of the dispensing auger 38 coincides with the secondary axis 36.

The top edge 33 and lower edge 34 of the base 12 and side wall 14, respectively, define a communicating opening 39 through which the mixing compartment 20 and dispensing compartment 21 communicate. A closure plate 40 which is movable by an hydraulic ram (not shown) between a raised open position illustrated in FIG. 3 with the two compartments 20 and 21 communicating and a lower closed position as illustrated in FIG. 2 with the two compartments 20 and 21 isolated from each other selectively closes the communicating opening 39 to facilitate mixing of the animal feed in the mixing compartment 20 prior to dispensing. The rotational movement of the mixing rotor 30 in the mixing compartment 20 in the direction of the arrow A, as well as mixing animal feed therein, also urges the mixed animal feed from the mixing compartment 20 into the dispensing compartment 21 when the closure plate 40 is in the open position.

A door 41 closes the dispensing outlet 22, and is connected to the closure plate 40 by a chain 37, so that as the closure plate 40 is opened the door 41 is also opened and vice-versa. A chute 31 is connected to the door 41 by chains 29 for directing mixed animal feed from the dispensing outlet 22.

A drive transmission 43 is mounted on the front end wall 17 for rotating the mixing rotor 30 in the direction of the arrow A and the dispensing auger 38 in the direction of the arrow B. The drive transmission 43 comprises chain and sprocket drives. The drive for the dispensing auger 38 and the mixing rotor 30 are interconnected so that the mixing rotor 30 rotates at a speed of approximately 10 revs. per minute, and the dispensing auger 38 rotates at a speed of approximately 90 revs. per minute. A splined input shaft 44 of a gearbox 42 of the drive transmission 43 receives drive from a drive shaft (not shown) connected to a power take-off shaft of the tractor (not shown) for delivering drive to the drive transmission 43.

The mixer feeder wagon 1 according to the invention up to here is substantially similar to the mixer feeder wagons disclosed in British Patent Specification No. GB-A-2,139, 911 and European Patent Specification No. EP-A-0,427,483, and it is not intended to describe the general construction of the mixer feeder wagon 1 in further detail.

Turning now to the mixing rotor 30, the mixing rotor 30 comprises a main rotor shaft 45 which is rotatably mounted in bearings 24 (see FIG. 4) in the end walls 17 and 18. Pairs of radial members 46 extend radially from the rotor shaft 45, and carry elongated mixing paddles 47 for mixing the animal feed in the mixing compartment 20. Four mixing paddles 47 arranged in pairs are provided. One pair is located to the front end of the mixing compartment 20, and the other pair to the rear end. The mixing paddles 47 of each pair are equi-spaced around the rotor shaft 45 at 180° intervals, and the pairs of mixing paddles 47 are arranged at 90° to each other. Each mixing paddle 47 is of rectangular box section steel material which forms a radially extending leading surface 48 which extends parallel to the central axis 25, and a trailing surface 49. The trailing surface 49 extends from an outer free edge 50 of the leading surface 48 in a circumferential rearward direction relative to the direction of rotation of the mixing rotor 30.

A plurality of first blades 55 are mounted on the mixing paddles 47 and co-operate with a plurality of pairs of second 56 blades mounted in the mixing compartment on the base 12 for cutting fibrous material into relatively short lengths as the mixing rotor 30 rotates in the direction of the arrow A. The first cutting blades 55 are aligned with each other longitudinally along the mixing paddles 47 and extend substantially parallel to the central axis 25 and radially outwardly thereof. The second blades 56 are arranged parallel to each other and extend radially inwardly from the base 12 into the mixing compartment 20 and extend transversely relative to the central axis 25.

The first blades 55 of each mixing paddle 47 are formed by an elongated plate member 57 of steel which is secured to the leading surface 48 of the corresponding mixing paddle 47. A plurality of spaced apart slots 58 extend radially into each plate member 57 from a free longitudinally extending peripheral edge 59 to form the first blades 55. The slots 58 extend into the plate member 57 so that a root 60 of each slot 58 substantially coincides with the free edge 50 of the leading surface 58. A portion 61 of each plate member 57 below the first blades 55 and the first blades 55 act essentially as an abutment face of each mixing paddle 47 for abutting and mixing the animal feed in the mixing compartment 20 as the mixing rotor 30 rotates.

The second blades 56 are of steel plate material and are formed in pairs from respective single plates 64 of steel which are bent at 65 to form the respective pairs of second blades 56 joined by a base plate 66. The pairs of second blades 56 are secured to the inner surface 63 of the base 12 towards the lowest portion of the base 12 so that the first blades 55 commence to co-operate with the second blades 56 as the mixing paddles 47 reach the lowest point of their travel on each rotational cycle of the mixing rotor 30. The pairs of second blades 56 are mounted on the base 12 in staggered formation circumferentially in the general direction of movement of the mixing paddles 47 so that the first blades 55 on each mixing paddle 47 sequentially and progressively co-operate with second blades 56 as the mixing rotor 30 rotates, and as the paddles 47 move upwardly in the mixing compartment 20. Screws 67 through the base plates 66 secure the second blades 56 to the base 12.

The first blades 55 are arranged on the mixing paddles 47, and the second blades 56 are arranged on the base 12 so that one first blade 55 passes between each pair of second blades 56 on rotation of the mixing rotor 30, and also so that one first blade passes between adjacent second blades 56 of adjacent pairs of second blades 56 as the mixing rotor 30 rotates. Additionally, the first blades 55 are arranged so that a second blade 56 passes between adjacent first blades 55 as the mixing rotor 30 rotates so that the adjacent first blades 55 urge fibres extending across the slots 58 against the second blades 56 for cutting the fibres.

Each second blade 56 is provided with a leading cutting edge 68 against which the fibres are urged by the first blades 55 for cutting thereof. The leading edges 68 are inclined away from a radius extending from the central axis 25 in the direction of rotation of the mixing motor 30, so that the first blades 55 progressively engage the leading cutting edges 68 as the mixing rotor 30 rotates for forming an abrading type cutting action against the fibrous material. The second blades 56 are tapered towards the leading cutting edge 68 for providing a relatively sharp cutting edge 68.

The slots 58 in the plate members 57 which form the first blades 55 are tapered towards their roots 60, thereby forming the first blades 55 with a taper towards their free edge 59. This, it has been found increases the cutting efficiency of the co-operating action between the first blades 55 and the second blades 56. The width of the slot 58 between adjacent first blades 55 ranges from approximately 65 mm at the root 60 of the slot 58 and 125 mm at the peripheral free edge 59 of the first blades 55. The thickness of each second blade 56 is approximately 6 mm. This, thus, leaves a clearance d on each side of the second blades 56 between the second blades 56 and the first blades 55 which ranges from approximately 30 mm to 60 mm. This clearance, it has been found prevents material jamming between the first and second blades 55 and 56, and does not affect the cutting action which is achieved by the co-operation of the first and second blades 55 and 56.

To some extent the spacing between the second blades 56 determines the lengths into which the fibrous material is cut. In this embodiment of the invention the spacing between the second blades 56 of each pair of second blades 56 is 210 mm, approximately, and the spacing between adjacent second blades 56 of adjacent pairs of second blades 56 is 190 mm, approximately.

The second blades 56 extend from the base 12 a radial distance towards the central axis 25 of 80 mm, approximately. Thereby, providing a clearance between tips 69 of the second blades 56 and the roots 60 of the plate members 57 of 10 mm. In this embodiment of the invention each first blade 55 is of approximately 80 mm radial length from the roots 60 of the slots 58. The locus of the free peripheral edge 59 of the first blades 55 as the mixing rotor 30 rotates substantially defines the inner surface of the base 12. However, a clearance of approximately 20 mm is provided between the free peripheral edges 59 of the first blades 55 and the inner surface 63 of the base 12. The distance s centre to centre between adjacent pairs of second blades 56 in a circumferential direction is 300 mm, approximately. In other words, the pairs of second blades 56 are staggered relative to each other with an offset of 300 mm in a circumferential direction.

An elongated strip 70 of flexible resilient material, typically, a rubber or plastics material is provided on one of the mixing paddles 47 of each pair for wiping the inner surface 63 of the base 12 and for urging the mixed animal feed from the mixing compartment 20 into the dispensing compartment 21, particularly, when the animal feed includes grains, meal mixes and/or caustic treated wheat. Radially extending slits (not shown) extend into the strips 70 for accommodating the second blades 56 as the mixing rotor 30 rotates.

An elongated longitudinally extending cutting member 72 is mounted to and below the inclined wall 26 by brackets 73. The cutting member 72 terminates in a longitudinally extending leading cutting edge 74 which extends parallel to the central axis 25, and completely along one side of the open mouth 28, and into the open mouth 28. The cutting member 72 co-operates with the first cutting members 55 and the mixing paddles 47 for separating fibrous material ripped by the first cutting members 55 and the mixing paddles 47 from a bale of fibrous material sitting in the open mouth 28 away from the bale. The longitudinal cutting member 72 is of arcuate shape and defines an axis of generation which coincides with the central axis 25 of the container 10.

In use, to mix animal feed in the mixing compartment 20, the closure plate 40 is lowered into the closed position for closing the communicating opening 39. The mixing rotor 30 and the dispensing auger 38 are rotated by applying drive to the drive transmission 43 from the power take-off shaft of a tractor to which the wagon 1 is hitched. A bale or part thereof of hay, straw, silage or the like to be mixed with ingredients of the animal feed is placed in the open mouth 28 and supported therein by the inclined wall 26 and the side wall 14. As the mixing rotor 30 rotates in the direction of the arrow A, the first blades 55 rip fibrous material from the bale in the open mouth 28. As the first blades 55 pass the leading cutting edge 74 of the cutting member 72 the ripped fibrous material is separated from the bale by the cutting member 72. As the mixing rotor 30 continues to rotate and the first blades 55 pass between the second blades 56 the fibrous material is cut into shorter lengths by the co-operating action of the first and second blades 55 and 56. Further rotational cycles of the mixing rotor 30 causes further cutting of the fibrous material into still shorter lengths. As the fibrous material is being cut, other ingredients of the animal feed may be added into the mixing compartment 20 with the fibrous material for mixing therewith. Indeed, where the ingredients to be added are relatively wet, it is advantageous to add these shortly after the fibrous material has been delivered into the mixing compartment 20, as the presence of the relatively wet ingredients in the mixing compartment 20 tends to accelerate the cutting action between the first and second blades 55 and 56. The mixing rotor 30 is rotated until the fibrous material has been cut into relatively short lengths of the desired length, and the fibrous material and ingredients have been thoroughly mixed together.

On mixing being completed, with the mixing rotor 30 and the dispensing auger 38 still rotating, the closure plate 40 is raised into the open position and the mixed animal feed in the mixing compartment 20 is urged into the dispensing compartment 21 by the mixing paddles 47 of the mixing rotor 30. The dispensing auger 38 urges the animal feed through the dispensing compartment 21 in the direction of the arrow C, and through the dispensing outlet 22.

Referring now to FIGS. 10 to 12 there is illustrated a portion of a mixer feeder wagon according to another embodiment of the invention which is indicated generally by the reference numeral 80. The mixer feeder wagon 80 is substantially similar to the mixer feeder wagon 1 and similar components are identified by the same reference numerals. The main difference between the mixer feeding wagon 80 and the mixer feeder wagon 1 is in the mounting of the second blades 56. In this embodiment of the invention the second blades 56 are mounted on a carrier means, namely, a carrier shaft 81 which is located externally of the container 10, and pivotally carried on pivot brackets 82 extending from the base 12 of the container 10. The second blades 56 are moveable by pivoting the carrier shaft 81 from an operative position illustrated in FIG. 10 and 11, with the second blades 56 extending into the mixing compartment 20 for co-operating with the first blades 55 for cutting fibrous material, to an inoperative position illustrated in FIG. 12, with the second blades 56 withdrawn from the mixing compartment 20. A plurality of slots 83 in the base 12 accommodate the second blades 56 into and out of the mixing compartment 20.

A drive means comprising an hydraulic ram 84 mounted on the container 10 pivots the carrier shaft 81 between an operative position corresponding to the operative position of the second blades 56 and an inoperative position corresponding to the inoperative position of the second blades 56 for moving the second blades 56 inwardly and outwardly of the mixing compartment 20 between the operative and inoperative positions, respectively. Mounting brackets 85 mount a housing 86 of the ram 84 to the base 12 of the container 10. A piston rod 87 of the ram 84 is connected to the carrier shaft 81 by a pair of mounting brackets 88 which extend radially from the carrier shaft 81 for pivoting thereof.

In this embodiment of the invention the second blades 56 are aligned longitudinally along the base 12 of the mixing compartment 20 adjacent the lower end of the mixing compartment 20. Thus the first blades 55 of each mixing paddle 47 co-operate with the corresponding second blades 56 simultaneously rather than progressively in the case of the mixer feeder wagon 1.

Otherwise, operation of the mixer feeder wagon 80 is similar to that of the mixer feeder wagon 1.

A particularly important advantage of the mixer feeder wagon 80 over the mixer feeding wagon 1 is that when the fibrous material has been cut to the desired length, the second blades 56 may be withdrawn from the mixing compartment 20, and thus, further rotation of the mixing rotor 30 only mixes the animal feed in the mixing compartment, and since no further cutting action is provided between the first and second blades 55 and 56, the power requirement of the mixing rotor 30 is reduced when the second blades 56 are withdrawn from the mixing compartment 20. This advantage is achieved when the mixer feeder wagon 80 is used initially to cut the fibrous material into short lengths, and on the fibrous material being cut into lengths of the desired size the second blades 56 are withdrawn, and the other ingredients of the animal feed are delivered into the mixing compartment so that the additional power required for mixing the additional ingredients is compensated for by the reduction in the power requirement due to the fact that no further cutting of the fibrous material takes place.

Referring now to FIGS. 13 to 15, there is illustrated a portion of a mixer feeder wagon 90 according to another embodiment of the invention. The mixer feeder wagon 90 is substantially similar to the mixer feeder wagon 1, and similar components are identified by the same reference numerals. The main difference between the mixer feeder wagon 90 and the mixer feeder wagon 1 is in the construction and arrangement of the first blades, which in this embodiment of the invention are indicated by the reference numeral 91. The first blades 91 are parallel to and spaced apart from each other, and extend radially relative to the central axis 25 and also transversely of the central axis 25, rather than parallel to the central axis 25 as in the case of the first blades 55 of the mixer feeder wagon 1. In this embodiment of the invention pairs of spaced apart first blades 91 are provided for co-operating with each second blade 56. The first blades 91 are of triangular shape, and extend from the mixing paddles 47 with a leading edge 92 extending substantially radially from the leading surface 48 of the mixing paddles 47. In this embodiment of the invention the leading edge 92 of each first blade 91 is relatively blunt.

The second blades 56 are arranged in pairs, and are aligned longitudinally along the base 12, although they may be staggered circumferentially as in the case of the second blades 56 of the apparatus 1. In this embodiment of the invention the spacing between the second blades 56 of each pair of second blades is approximately 250 mm and the spacing between the first blades 91 of each pair which co-operate with a corresponding second blade 56 is approximately 65 mm. The thickness of the second blades 56 is approximately 6 mm, and thus, the clearance d between the second blades 56 and their adjacent first blades 91 on opposite sides of the second blades 56 is approximately 30 mm.

Operation of this mixer feeder wagon 90 is substantially similar to that of mixer feeder wagon 1.

While the first blades have been described as being provided on all of the mixing paddles, first blades may in certain cases be provided only on one or two of the mixing paddles, and when provided on two of the mixing paddles, it is envisaged that the first blades will be provided on one of the mixing paddles of each pair of mixing paddles. In other words, first blades would be provided on one of the pair of mixing paddles towards the front of the mixing compartment, and first blades would be provided on one of the mixing paddles of the other pair of mixing paddles towards the rear of the mixing compartment.

While the mixing paddles have been described as being of rectangular box section steel, they may be formed of any other suitable cross-section, for example, angular steel, and in certain cases, a pair of angular steel members may be secured together to form a box section.

It is envisaged in certain cases that the second blades may be mounted on a shaft which would be rotatably mounted about a longitudinal axis parallel to the central axis of the mixing compartment. In such cases, it is envisaged that the second blades may be provided by a plurality of circular discs which would be coaxially mounted on the rotatable shaft.

While the second blades in the apparatus illustrated in FIGS. 1 to 9 have been described as being mounted on the base in staggered relationship circumferentially relative to the rotational movement of the rotor, the first cutting blades could be staggered circumferentially around the mixing rotor instead of staggering the second blades, or as well as staggering the second blades. Needless to say, the second blades in the apparatus illustrated with reference to FIGS. 10 to 12 may also be staggered circumferentially relative to the rotational movement of the mixing rotor.

We claim:

1. Apparatus for mixing and dispensing material of a fibrous nature, the apparatus (1) comprising:

a container (10) defining a hollow interior region (19) which forms a mixing compartment (20) for the material, the mixing compartment (20) defining a longitudinally extending central axis (25), a mixing rotor (30) in the mixing compartment (20) for mixing material therein, the mixing rotor (30) being rotatable in the mixing compartment (20) about a rotational axis substantially coinciding with the central axis (25) and comprising:

a plurality of elongated mixing paddles (47) extending generally longitudinally in the mixing compartment (20) for mixing the material in the mixing compartment (20), a plurality of first blades (55) mounted on at least one of the mixing paddles (47), the first blades being spaced apart longitudinally along the mixing paddle (47) relative to the central axis (25) and extending in a generally radial direction from the mixing paddle, and plurality of second blades (56) connected to the container (12), the second blades (56) being spaced apart longitudinally relative to the central axis (25) and extending towards the mixing rotor (30) for co-operating with the first blades (55) for cutting the fibrous material as the mixing rotor (30) rotates.

2. Apparatus as claimed in claim 1 characterised in that the first and second blades (55,56) are located so that the second blades (56) extend in between the first blades (55) as the first blades (55) pass by the second blades (56) on rotation of the mixing rotor (30).

3. Apparatus as claimed in claim 1 characterised in that the second blades (56) are arranged in pairs so that one first blade (55) passes between a corresponding adjacent pair of second blades (56), on rotation of the mixing rotor (30).

4. Apparatus as claimed in claim 1 characterised in that each first blade (55) is formed by a first plate member (55).

5. Apparatus as claimed in claim 4 characterised in that a plurality of first blades (55) are formed by a single elongated plate member (57), a plurality of spaced apart slots (58) extending radially into the elongated plate member (57) from a free longitudinally extending edge (59) of the elongated plate member (57) for forming the respective first plate members (55).

6. Apparatus as claimed in claim 1 characterised in that the second blades (56) extend in respective planes which extend in a generally radial direction towards the central axis (25) and transversely thereof.

7. Apparatus as claimed in claim 1 characterised in that each second blades (56) is formed by a second plate member (56), the second plate members (56) being parallel to each other and extending transversely relative to the central axis (25).

8. Apparatus as claimed in claim 1 characterised in that each first blades (55) lies in a plane which extends parallel to the central axis (25) of the mixing compartment (20).

9. Apparatus as claimed in claim 1 characterised in that the first blade (55) lie in respective planes which extended parallel to each other and transversely of the central axis (25).

10. Apparatus as claimed in claim 1 characterised in that each second blade (56) defines a leading cutting edge (68) which faces towards the first blades (55) as the first blades (55) are approaching the second blade (56).

11. Apparatus as claimed in claim 13 characterised in that the leading cutting edge (68) of each second blade (56) is angled away from the central axis (25) in the direction of motion of the first blades (55) as they approach the second blades (56).

12. Apparatus as claimed in claim 10 characterised in that each second blade (56) is tapered adjacent and towards the leading cutting edge (68) for forming a relatively sharp leading cutting edge (68).

13. Apparatus as claimed in claim 10 characterised in that the leading cutting edge (68) of each second blade (56) is relatively blunt.

14. Apparatus as claimed in claim 10 characterised in that the leading cutting edge (58) of each second blade (55) is inclined relative to a radius extending from the central axis (25) so that the first blades (55) progressively co-operate with the leading cutting edges (68) of the second blades (56) as the mixing rotor (30) rotates.

15. Apparatus as claimed in claim 1 characterized in that clearance (d) is provided between adjacent first and second blades (55,56) in a direction parallel to the central axis (25) as the first blades (55) pass by the second blades (56) on rotation of the mixing rotor (30).

16. Apparatus as claimed in claim 15 characterised in that the clearance (d) provided between adjacent first and second blades (55,56) is in the range of 2 mm to 300 mm.

17. Apparatus as claimed in claim 1 characterized in that the second blades (56) are mounted on the container (10) forming the mixing compartment (20), and extend inwardly into the mixing compartment (20).

18. Apparatus as claimed in claim 1 characterised in that the second blades (56) are mounted on the container (10) adjacent a lower end of the mixing compartment (20), so that the first blades (55) commence to co-operate with the second blades (56) as the first-blades (55) reach their lowest point in a rotational cycle of the mixing rotor (30).

19. Apparatus as claimed in claim 1 characterised in that the second blades (56) are stationary blades (56).

20. Apparatus as claimed in claim 1 characterized in that the second blades (56) are moveable between an operative position whereby the second blades (56) co-operate with the first blades (55), and an inoperative position for preventing cooperation between the first and second blades (55,56).

21. Apparatus as claimed in claim 20 characterized in that the second blades (56) are mounted on a carrier means (81), the carrier means (81) being moveable between an operative position and an inoperative position corresponding respectively to the operative and inoperative positions of the second blades (56).

22. Apparatus claimed in claim 29 characterised in that the carrier means (81) is mounted externally on the container (10), and the second blades (56) extend through blade accommodating slots (83) formed in the container (10), and are moveable between the operative and inoperative positions through the slots (83), the second blades (56) being withdrawn from the mixing compartment in the inoperative position.

23. Apparatus as claimed in claim 21 characterized in that the carrier means (81) is pivotally mounted on the container (10) and is pivotal about a pivot axis between the operative and the inoperative positions, the pivot axis of the carrier means (81) extending substantially parallel to central axis (25).

24. Apparatus as claimed in claim 20 characterized in that a drive means (84) for moving the second blades (56) between the operative and the inoperative positions is provided.

25. Apparatus as claimed in claim 1 characterized in that the mixing paddles (47) are spaced apart circumferentially around the rotational axis (25) of the mixing rotor (30), the mixing paddles (47) being carried on respective elongated radial members (46) extending radially from the mixing rotor (30), and the first blades extending radially outwardly from the at least one mixing paddle (47).

26. Apparatus as claimed in claim 25 characterised in that the mixing rotor (30) comprises a main shaft (45) which defines the rotational axis (25) of the mixing rotor (30), the radial members (46) extending radially from the main shaft (45) to the respective mixing paddles (47), and the mixing paddles (47) are equi-spaced circumferentially around the mixing rotor (30).

27. Apparatus as claimed in claim 1 characterised in that the container (10) is of partly circular transverse cross-section relative to the central axis (25), and defines a partly circular base (12) of the mixing compartment (20), the locus of the free ends (59) of the first blades (55) as the mixing rotor (30) rotates substantially defining the inner surface (63) of the base (12) of the mixing compartment (20).

28. Apparatus as claimed in claim 1 characterised in that the container (10) defines an upwardly facing open mouth (28) to the hollow interior region (19), and an elongated cutting member (72) extends substantially parallel to the central axis (25) adjacent the open mouth (28), the cutting member (72) having a leading cutting edge (74) extending parallel to the central axis (25) and into the open mouth (28) for co-operating with the mixing rotor (30) for separating fibrous material from a relatively large bale of fibrous material supported in the open mouth (28), and the container (10) defines a dispensing compartment (21) which defines a secondary axis (36), the dispensing compartment (21) extending relative to the mixing compartment (20) so that the secondary axis (36) and the central axis (25) extend substantially parallel to each other, a dispensing rotor (38) being located in the dispensing compartment (21) for dispensing mixed material through a dispensing outlet (22), the dispensing compartment (21) communicating with the mixing compartment (20) through a communicating opening (39), and a closure plate (40) being operable between a closed position with the dispensing compartment (21) isolated from the mixing compartment (20) and an open position with the dispensing compartment (21) and the mixing compartment (20) communicating for transfer of mixed material from the mixing compartment (20) into the dispensing compartment (21).

29. Apparatus as claimed in claim 1 characterized in that the second blades (56) are parallel to each other, and the first blades (55) extend perpendicularly to the second blades (56), as the first blades (55) pass adjacent the second blades (56).

30. Apparatus as claimed in claim 1 characterized in that at least some of the second blades (56) are located in the mixing compartment (20) in staggered relationship relative to the other second blades (56) in a circumferential direction relative to the direction of rotation of the mixing rotor (30) so that the first blades (55) progressively co-operate with the second blades (56) as the mixing rotor (30) rotates for minimizing the power requirement for cutting the fibrous material.

31. Apparatus as claimed in claim 1 characterized in that each mixing paddle (47) is provided with a leading surface (48) for abutting the material as the mixing rotor (30) rotates, the leading surface (48) extending substantially radially and substantially parallel to the central axis (25), the first blades (55) extending radially outwardly from the leading surface (48) of the at least one mixing paddle (47).

\* \* \* \* \*